Oct. 1, 1968
C. P. FROMMELT ET AL
3,403,489
LOADING DOCK SHELTERS
Filed Dec. 12, 1966
3 Sheets-Sheet 1
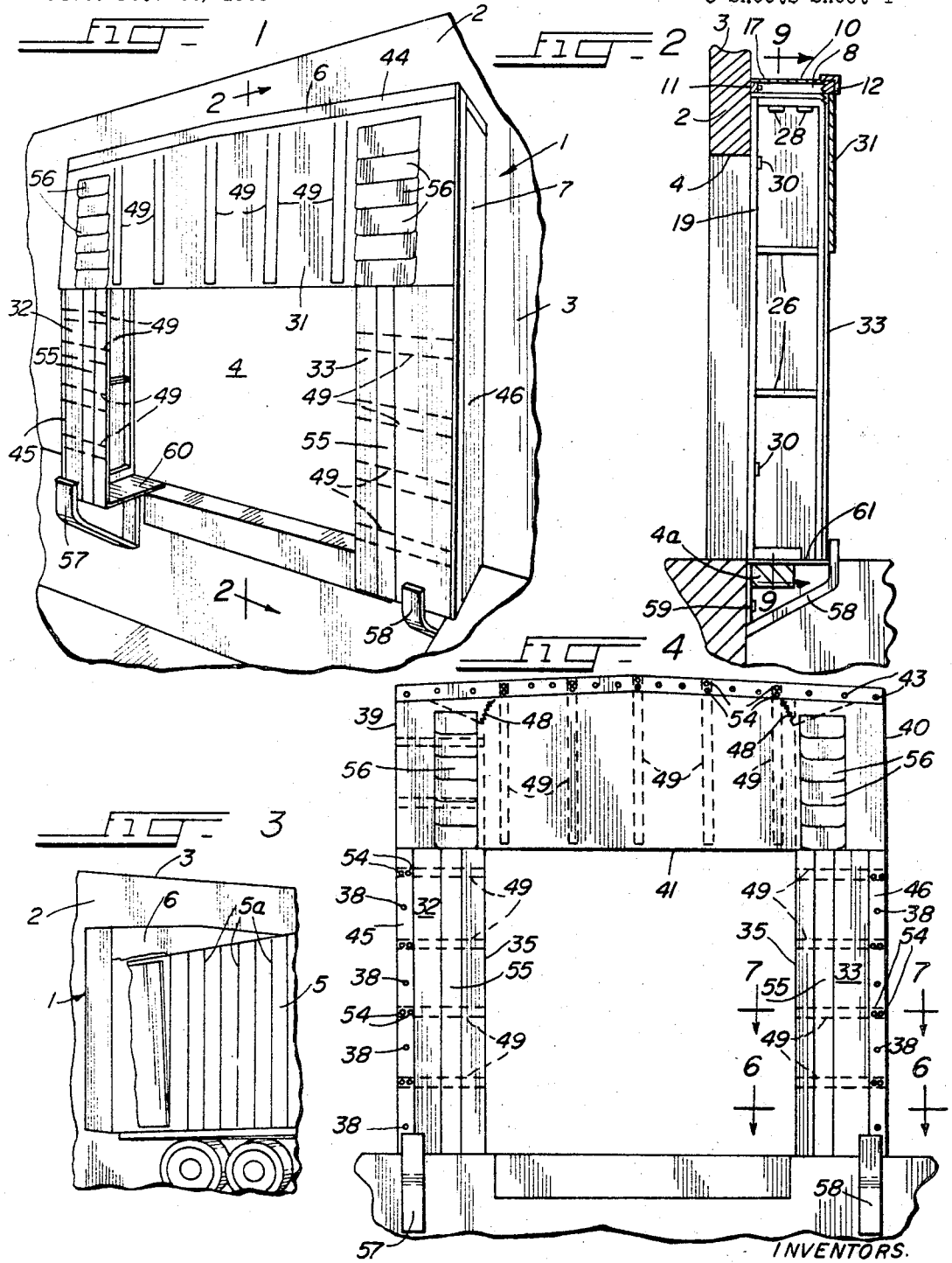
INVENTORS.
CYRIL P. FROMMELT
SYLVAN J. FROMMELT
BY Marzall, Johnston, Cook & Root
ATTYS.

Oct. 1, 1968  C. P. FROMMELT ET AL  3,403,489
LOADING DOCK SHELTERS
Filed Dec. 12, 1966  3 Sheets-Sheet 2
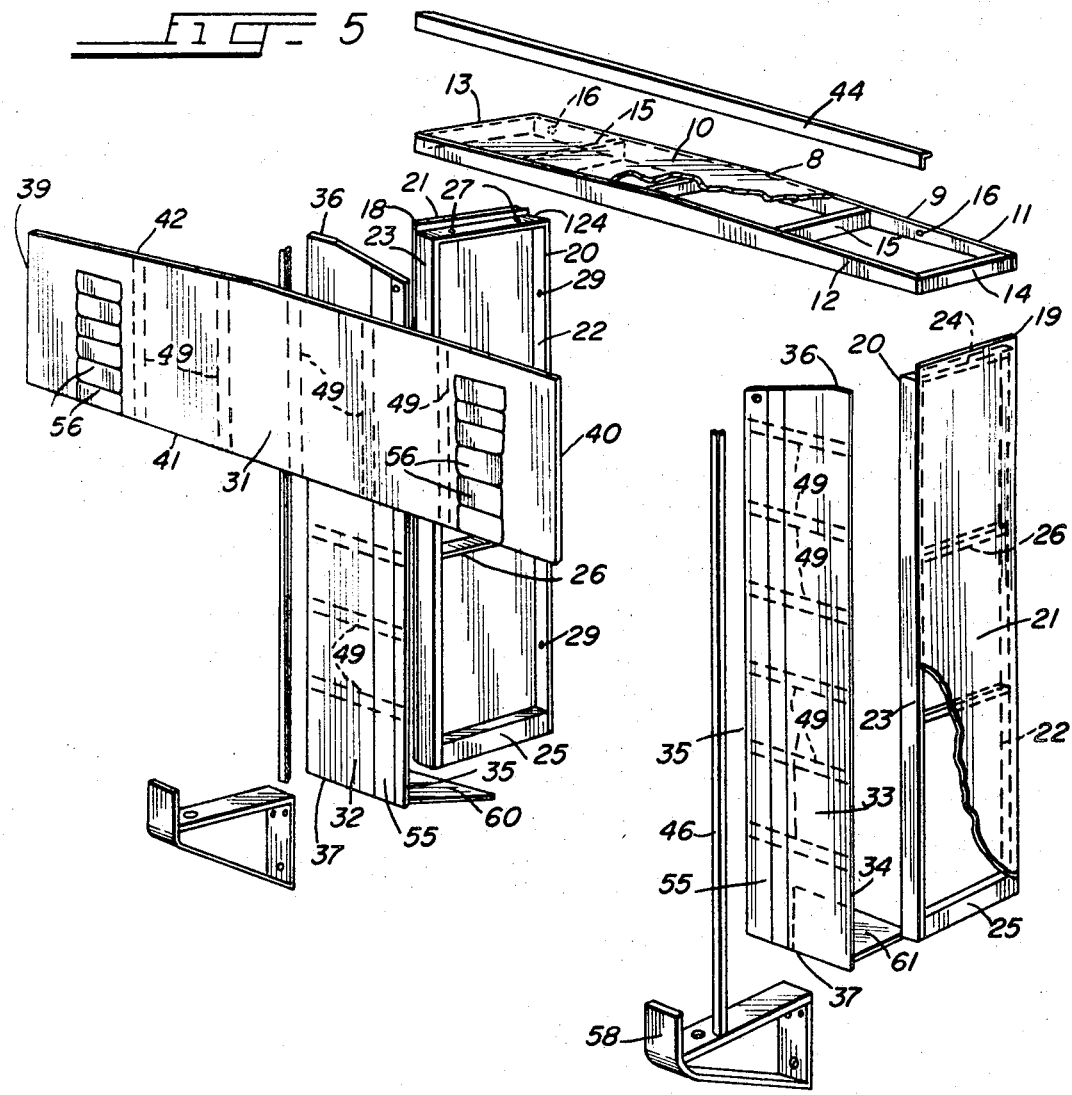
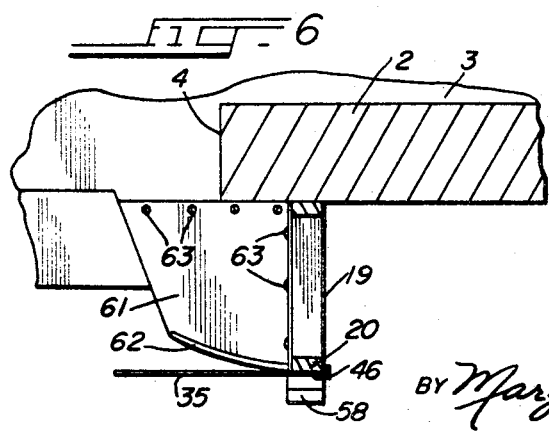
INVENTORS.
CYRIL P. FROMMELT
SYLVAN J. FROMMELT
BY Marzall, Johnston, Cook & Root
ATTYS.

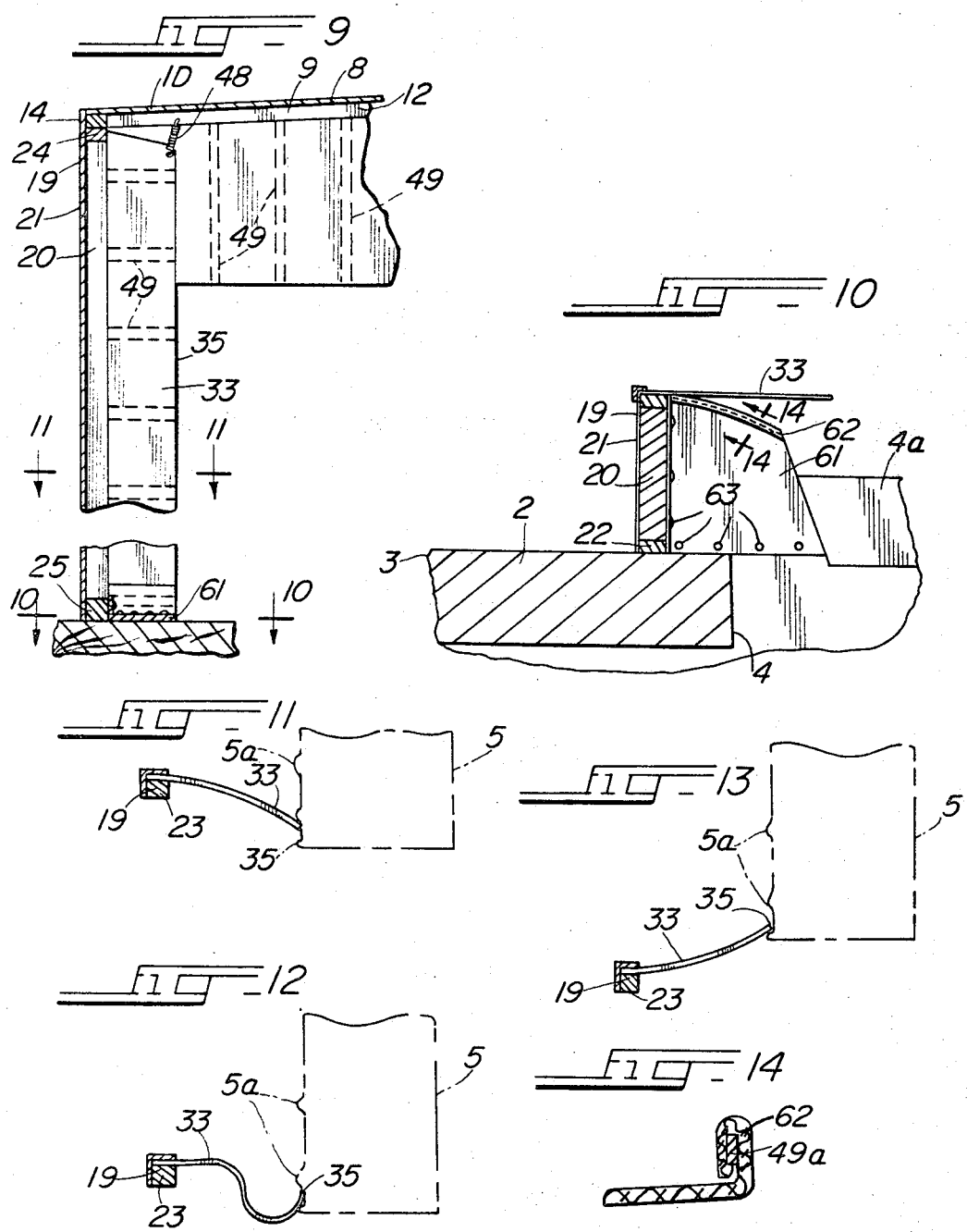

United States Patent Office 3,403,489
Patented Oct. 1, 1968

3,403,489
LOADING DOCK SHELTERS
Cyril P. Frommelt and Sylvan J. Frommelt, Dubuque, Iowa, assignors to Dubuque Awning & Tent Company, Dubuque, Iowa, a corporation of Iowa
Filed Dec. 12, 1966, Ser. No. 601,169
13 Claims. (Cl. 52—204)

This invention relates to loading dock shelters, and, more particularly, to such shelters that are particularly well adapted for use as truck dock shelters.

Loading dock shelters of the retractable type, such as, for example, loading dock shelters of the type shown in our United States Letters Patent No. 2,892,463 have been heretofore known in the art. Also, loading dock shelters of the type embodying resilient pad members against which trucks, and the like, to be loaded and unloaded may be backed, such as, for example, loading dock shelters of the type shown in our United States Letters Patent No. 3,181,205 also have been heretofore known in the art. Such loading dock shelters have been highly successful and afford effective shelter for men and materials during the loading and unloading of a truck, or the like, through a warehouse doorway equipped with such shelters.

Loading dock shelters of the types shown in both of our aforementioned patents may be said to be shelters which embody yieldable frames around the doorway of a warehouse on which they are mounted. Both of them afford effective, automatic sealing engagement between the shelters and the trucks operatively engaged therewith.

It is an important object of the present invention to enable a novel loading dock shelter having a substantially rigid supporting frame to be afforded, which is effective to automatically sealingly engage a truck, or the like, in a novel and expeditious manner.

Another object of the present invention is to afford a novel loading dock shelter of the type which may be mounted around the doorway of a warehouse, or the like, and into which a truck, to be loaded or unloaded, may be backed in such position that the frame of the shelter extends around the truck in outwardly spaced relation thereto, but with the shelter affording effective protection from the elements for the workmen and materials moving back and forth between the truck and the warehouse during loading and unloading operations.

Another object of the present invention is to afford a novel loading dock shelter, which, when not in use, at all times remains in position to receive such a truck in shelter-affording relation thereto.

Yet another object of the present invention is to afford a novel loading dock shelter of the type which embodies a top panel and side panels, which drape around the rear end of a truck disposed in operative position relative to the shelter.

An object ancillary to the foregoing is to afford such a novel loading dock shelter wherein the parts thereof are constituted and arranged in such a manner that when a truck is disposed in such operative position relative to the shelter, the aforementioned top panel and side panels are automatically yieldingly, but firmly, held in sealing engagement with the top and sides of the truck in a novel and expeditious manner.

Another object is to minimize wear of loading dock shelters of the aforementioned type by reason of the engagement between such a truck and the portions of the shelter draped therearound during operation of such a shelter.

Another object of the present invention is to afford a novel loading dock shelter embodying a novel spring construction for effecting sealing engagement between a truck and the loading dock shelter.

A further object of the present invention is to afford a novel loading dock shelter which embodies windows constituted and arranged in a novel and expeditious manner therein, whereby outside light may pass therethrough to afford illumination within the shelter.

Another object is to afford a novel loading dock shelter of the aforementioned type which may be quickly and easily mounted in operative position on a warehouse, or the like, and which, also, may be quickly and easily removed from the warehouse if the need to do so should arise.

A further object of the present invention is to afford a novel loading dock shelter of the aforementioned type which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a front perspective view of a loading dock shelter embodying the principles of the present invention, with the shelter shown mounted in operative position around the doorway of a warehouse;

FIG. 2 is a vertical sectional view taken substantially along the line 2—2 in FIG. 1;

FIG. 3 is a front perspective view of the loading dock shelter shown in FIG. 1, showing a truck disposed in operative position relative thereto;

FIG. 4 is a front elevational view of the loading dock shelter shown in FIG. 1;

FIG. 5 is an exploded, perspective view of the loading dock shelter shown in FIG. 1;

FIG. 6 is a fragmentary detail sectional view taken substantially along the line 6—6 in FIG. 4;

FIG. 7 is a fragmentary detail sectional view taken substantially along the line 7—7 in FIG. 4;

FIG. 8 is a fragmentary detail sectional view taken substantially along the line 8—8 in FIG. 7;

FIG. 9 is a fragmentary sectional view taken substantially along the line 9—9 in FIG. 2;

FIG. 10 is a fragmentary detail sectional view taken substantially along the line 10—10 in FIG. 9;

FIG. 11 is a fragmentary, somewhat diagrammatic, detail sectional view taken substantially along the line 11—11 in FIG. 9, and illustrating one operative position of a portion of the loading dock shelter shown in FIG. 1;

FIG. 12 is a view similar to FIG. 11 and illustrating another operative position of the loading dock shelter;

FIG. 13 is another view similar to FIG. 11 and illustrating yet another operative position of the loading dock shelter; and FIG. 14 is an enlarged, fragmentary detail sectional view taken substantially along the line 14—14 in FIG. 10.

A loading dock shelter 1 embodying the principles of the present invention is shown in the drawings to illustrate the presently preferred embodiment of the present invention. It is shown mounted on an outer wall 2 of a warehouse 3 in surrounding relation to a doorway 4 in the warehouse wall 2, FIG. 1. As will be discussed in greater detail presently, it is operable to afford an effective shelter between a truck 5, FIG. 3, and the doorway 4, when the truck 5 is disposed in normal operative position relative to the doorway 4 for loading and unloading operations to be effected through the rear end of the truck 5 and the doorway 4.

The loading dock shelter 1 embodies, in general, a front cover 6 mounted on a supporting frame 7 in such position that the front cover 6 is disposed outwardly of the wall 2 of the warehouse 3 in position to be operatively engaged by a truck, such as the truck 5, as will be discussed in greater detail presently.

The supporting frame 7 includes an elongated top wall 8, which embodies an elongated, substantially rectangular-shaped top frame 9 and a top cover 10 extending across the upper face of the top frame 9 in closing relation thereto. The top frame 9 may be made of any suitable material such as, for example, wood and embodies a rear longitudinally-extending member 11 and a front longitudinally-extending member 12 disposed in substantially parallel relation to each other, and two substantially parallel end members 13 and 14 extending between and connected to respective opposite ends of the longitudinal members 11 and 12, FIG. 5. Suitable cross braces 15 preferably are connected between the longitudinal members 11 and 12 in spaced relation to each other and to the end members 13 and 14.

The top cover 10 is preferably made of a single, self-supporting panel of a suitable water-impermeable, light-permeable material, such as, for example, a translucent sheet of material comprising a composition of a resin reinforced with glass fibers, readily available on the market. The top cover 10 is secured to the upper edges of the side members 11–14 of the top frame 9 by suitable means such as nails or cement, not shown. Suitable openings or holes 16 are preferably formed in the rear longitudinal member 11 of the top frame 9, through which suitable means such as bolts or screws 17, FIG. 2, may be inserted into the wall 2 of the warehouse 3 for securing the top wall 8 of the supporting frame 7 to the warehouse.

The supporting frame 7 also includes two elongated side walls 18 and 19, which extend downwardly from respective opposite ends of the top wall 8, FIGS. 1, 4 and 5. The side walls 18 and 19 of the supporting frame 10 are identical to each other in construction, except that they are reverse images, and the same reference numerals are used herein to indicate corresponding parts of the side walls 18 and 19.

Each of the side walls 18 and 19 includes an elongated side frame 20 and an outer side cover 21 secured to the outer face of the respective side frame 20, FIG. 5. Each of the side frames 20 is substantially rectangular in shape, and embodies a rear, longitudinally extending member 22 and a front, longitudinally extending member 23 disposed in substantially parallel relation to each other, and an upper end member 24 and a lower end member 25 extending between and secured to respective opposite ends of the longitudinal members 22 and 23 in substantially parallel relation to each other. Cross braces 26, which extend between the longitudinally-extending members 22 and 23 in spaced relation to each other and to the end members 24 and 25 are preferably afforded in each of the side frames 20.

Each of the upper end members 24 of the side walls 18 and 19 preferably have openings 27 therethrough, FIG. 5, through which suitable means, such as bolts or screws 28, FIG. 2, may be inserted into the end members 13 and 14 of the top panel 9 for securing the side walls 18 and 19 to the respective opposite ends of the top wall 8 of the supporting frame 7. Also, each of the rear longitudinal members 22 of each of the side frames 20 preferably have openings 29 extending therethrough, FIG. 5, through which suitable means such as bolts or screws 30, FIG. 2, may be inserted into the wall 2 of the warehouse 3 to firmly secure the side walls 18 and 19 to the warehouse 3 in depending relation to the top wall 8 of the supporting frame 7.

Like the top cover 10 of the top wall 8, each of the side covers 21 of the supporting frame side walls 18 and 19 preferably is made of a single, self-supporting panel of water-impermeable, light-permeable material, such as, for example, the aforementioned translucent material. They are secured to the outer faces of the respective side frames 20 by suitable means such as nails or cement, not shown.

The cover 6, which is mounted on the supporting frame 7 in outwardly spaced relation to the warehouse 3, embodies a head curtain or top panel 31 and two side curtains or side panels 32 and 33, FIGS. 1, 4 and 5. The panels 31–33 may be made of any suitable materials, but preferably they are made of a water-repellant, wear-resistant material, such as, for example, canvas duck or rubber-impregnated nylon fabric.

Each of the side curtains or side panels 32 and 33 is substantially rectangular in shape, and includes an outer longitudinally-extending edge portion 34, an inner longitudinally-extending edge portion 35, an upper end edge portion 36 and a lower end edge portion 37, FIG. 5. The outer longitudinal edge portions 34 of the side curtains 32 and 33 are secured to the front faces of the front longitudinal members 23 of the side frames 20 embodied in the side walls 18 and 19, respectively, by suitable means such as nails or screws 38, FIG. 4. The outer edge portions of the upper edges 36 of the side curtains 32 and 33 preferably extend upwardly above the respective side frames 20, to which they are attached, a sufficient distance that when the side walls 18 and 19 are disposed in operative position relative to the top wall 8, the edges 36 may be folded rearwardly under the front edge of the upper frame 9 for a purpose which will be discussed in greater detail presently. The inner edge portions of the upper edges 36 taper downwardly, FIGS. 5 and 9. The top wall 8 of the supporting frame 7 is preferably of a rake-cut design, the upper surface thereof sloping downwardly and outwardly from its longitudinal center to the opposite ends thereof, so that the top wall 8 affords a sloping roof type of construction affording drainage toward each of its opposite ends.

The head curtain or top panel 31 of the cover 6 is elongated, and has two substantially parallel end edges 39 and 40, a substantially straight lower edge 41 extending between the end edges 39 and 40 in substantially perpendicular relation thereto, and a top edge 42 which bows upwardly away from the lower edge 41 to conform to the shape of the upper edge of the front longitudinal member 12 of the top frame 9. The upper edge portion 42 of the head curtain 31 is secured to the front face of the front longitudinal member 12 of the top frame 9 by suitable means such as nails or screws 43.

If desired, suitable trim members 44, 45 and 46 may be mounted on the top wall 8 and the side walls 18 and 19 of the supporting frame 7 in overlying relation to the edges of the cover members 31–33 secured thereto, respectively, FIGS. 1, 4 and 5. The trim members 44–46 may be of any suitable type, but preferably are elongated, angle members made of suitable material such as, for example, aluminum. In the drawings, the trim members 44–46 are shown secured to the top wall 8 and the side walls 18 and 19 by the same nails or screws 43 and 38 as are the upper edges of the head curtain 31 and the outer edges of the side curtains 18 and 19, respectively. However, as will be appreciated by those skilled in the art, this is merely for ease of illustration, and, if desired, the trim members 44–46 may be secured to the top wall 8 and the side walls 18 and 19 of the supporting frame 7 in overlying, concealing relation to the nails or screws 43 and 38, after the head curtain 31 and the side curtains 32 and 33 have been secured to the top wall 8 and the side walls 18 and 19, respectively.

In assembling the loading dock shelter 1, the head curtain 31 and the side curtains 32 and 33 are preferably secured in operative position on the top wall 8 and the side walls 18 and 19, respectively, prior to mounting the supporting frame 7 on the warehouse 3. The trim members 44–46 also are preferably secured in operative position on the walls 8, 18 and 19 at this same time.

In mounting the loading dock shelter 1 in operative position on the warehouse 3, the top wall 8 preferably is first secured to the wall 2 of the warehouse 3 by the bolts 17 inserted through the openings 16 into the wall 2 in such position that the top wall 8 of the supporting frame 7 is disposed above the doorway 4 in substantially parallel relation thereto, FIG. 2. The position of the top wall 8 relative to the doorway 4 is such that it extends beyond both side jambs thereof, and the head curtain 31 projects downwardly below the plane of the top of the doorway 4 in position to drape itself across the top of the rear end of a truck, such as the truck 5, when the truck is backed into normal operative position relative to the doorway 4 for loading and unloading operations therethrough.

After the top wall 8 and the head curtain 31 have thus been mounted in operative position on the warehouse 3, the side walls 18 and 19, and the side curtains 32 and 33 carried thereby, are next preferably secured to the top wall 8. This is preferably accomplished by folding the outer edges of the upper edge portions 36 of the side curtains 32 and 33 rearwardly over the top members 24 of the respective side frames 20, to which they are attached, in such position that they are clamped between the frames 20 of the side walls 18 and 19 and the respective end members 13 and 14 of the top frame 9. The frames 20 and the side walls 18 and 19 may then be secured to the top frame 9 by inserting the bolts or screws 28, FIG. 2, upwardly through the openings 27 in the upper end members 24 of the frames 20 into the end members 13 and 14, respectively, of the top frame 9. With the side walls 18 and 19 thus secured to the top wall 8, the outer ends of the upper end portions 36 of the side curtains 32 and 33 are clamped between the top wall 8 and the side walls 18 and 19, respectively. The inner ends of the upper edge portions 36 on the side curtains 32 and 33 preferably have openings 47 therethrough, FIG. 5, and each of these inner ends may be yieldingly connected to the top wall 8 of the frame 7 by respective tension coil springs 48 connected between the front member 12 of the frame 7 and the holes 48. The side walls 18 and 19 of the supporting frame 7 may then be secured to the outer face of the wall 2 of the warehouse 3 by inserting the bolts or screws 30 through the openings 29 in the rear longitudinal members 22 of the respective side frames 20 into the wall 2, FIG. 2.

When the loading dock shelter 1 is thus secured in operative position on the wall 2 of the warehouse 3, the side walls 18 and 19 of the supporting frame 7 are disposed laterally outwardly of the side jambs of the doorway 4 in such position that the side curtains 32 and 33 project across the adjacent portions of the doorway 4 in such position that when a truck, such as the truck 5, is disposed in the aforementioned operative position relative to the doorway 4 for loading and unloading operations, the side panels 32 and 33 engage the respective adjacent sides of the rear end of the truck 5.

Each of the panels 31–33 of the cover 6 embodies a plurality of elongated stays 49 extending transversely thereacross in substantially parallel relation to each other, FIGS. 1, 4 and 5. The stays 49 may be made of any suitable resilient material, such as, for example, spring steel, and are so disposed in each of the panels 31–33 of the loading dock shelter 1 that they yieldingly urge each of the panels 31–33 to remain in their normal, at-rest position, wherein they extend across the front of the doorway, in substantially parallel relation thereto. In such position, the side curtains 32 and 33 are preferably disposed in uniplanar relation to each other and the top panel 31 projects substantially vertically downwardly across the upper portion of the doorway 4, forwardly of the side panels 32 and 33.

Each of the side panels 32 and 33 embodies rearwardly folded hems 50 and 51 at the outer and inner longitudinal edge portions 34 and 35 thereof, respectively, as is illustrated in FIG. 7 with respect to the side curtain 33. The stays 49 in each of the side curtains 32 and 33 extends between the hems 50 and 51 thereof and the outer ends of each of the stays 49 are disposed in respective pockets in the hems 50 and 51, such as the pocket 52 shown in FIG. 8. The pockets may be formed in the respective hems in any suitable manner, such as by sewing the lateral edges thereof, as indicated at 53 in FIG. 8. Like the side curtains 32 and 33, the head curtain 31 has rearwardly folding hems, not shown, at the upper longitudinal edge 42 and the lower longitudinal edge 41 thereof, respectively, and the stays 49 in the head curtains 31 are similarly mounted in, and held in position in, these last mentioned hems.

The outer ends of each of the stays 49 are secured by two nails or screws 54 to the front faces of the respective frame members 12 and 23 to which the cover panels 31–33, FIG. 4, are secured. The nails or screws 54 extend through the panels 31–33 and the respective stays 49 into the supporting frame 7. Preferably, the outer ends of the stays 49 are tightly secured to the respective portions of the frame 7 in firmly engaging juxtaposition thereto, so as to afford a firm anchor for the stays 49.

With the loading dock shelter 1 constructed in this manner, the curtains 31–33 are disposed in substantially parallel relation to the wall 2 of the warehouse 3, as illustrated with respect to the curtain 33 in FIG. 10, when they are disposed in normal at-rest position. When a truck, such as the truck 5, FIG. 3, backs into operative engagement with the shelter 1, it presses the head curtain 31 and the side curtains 32 and 33 rearwardly toward the doorway 4, as illustrated somewhat diagrammatically in FIG. 11, in such position that the curtains 31–33 are draped over the rear end of the top and sides of the truck 5, the stays 49 yieldingly deflecting rearwardly around their connections to the frame 7 to permit such movement of the curtains 31–33. The resiliency of the stays 49 is effective to urge the thus rearwardly deflected curtains 31–33 forwardly toward normal position, and are effective to hold the curtains 31–33 in firm sealing engagement with the top and side walls of the truck 5, so as to afford an effective, substantially weatherproof seal therebetween. Also, the stays 49 are effective to prevent dislodgment of the panels 31–33 from their sealing engagement with top and side walls of the truck 5 by outside force, such as, for example, the wind, and the like, or by shifting of the truck during loading and unloading operations.

In addition, the stays 49 are so constituted and arranged in each of the panels 31–33 that they are effective to firmly press the panels 31–33 into sealing engagement around obstructions which might project from the rear end of such a truck in position to engage one or more of the curtains 31–33.

Preferably, the stays 49 are so constituted and arranged and are of such resiliency that when a truck, such as the truck 5, FIG. 3, moves forwardly away from the aforementioned operative engagement with the loading dock shelter 1, shown in FIG. 11, the ends of the stays 49 disposed in the inner edges 41 and 35 of the curtains 31 and 32–33, respectively, move forwardly with the truck 5, and relative to the remainder of the respective stays 49, during the initial forward movement of the truck 5, so that the stays 49 and the curtains 31–33 are bent into a substantially S-shape, as illustrated in FIG. 12, during this portion of the forward movement of the truck 5. Thereafter, further forward movement of the truck 5 causes the stays 49 and the curtains 31–33 to move on forwardly into forwardly convex position, as illustrated in FIG. 13, and, as the truck 5 moves forwardly out of engagement with the curtains 31–33, they are moved by the respective stays 49 back into the aforementioned normal at-rest position shown in FIG. 10.

With this construction and mode of operation very little sliding movement occurs between the truck 5 and the curtains 31–33, to thereby minimize the abrasive wear of the inner edges 41 and 35 of the curtains 31 and 32–33, respectively, which would be afforded by such relative sliding movement. This is particularly important in instances where the exterior is rough or uneven, such as, for example, when it has corrugations, or the like, thereon such as the corrugations 5a, FIGS. 3, and 11–13. In such instances, the curtains 31–33 can "give" with the forward movement of the truck and move forwardly therewith, without sliding therealong while the pressure is the greatest thereon, and, yet, the curtains 31–33 are maintained in firm sealing engagement with the outside of the truck 5 until it moves out of engagement therewith so that, if the truck should be stopped at any point during such forward movement for further loading and unloading operations, the loading dock shelter 1 remains in good sealing engagement therewith.

Preferably, each of the side curtains 32 and 33 has a guide stripe 55 on the front face thereof, and extending vertically the full length thereof. The guide stripe 55 is preferably of a suitable brilliant color, such as, for example, yellow, and is disposed on the respective side curtains 32 and 33 in such position that when the loading dock shelter 1 is disposed in operative position on the warehouse 3, the stripes 55 are spaced from each other the same distance as the width of the trucks that the loading dock shelter 1 is primarily intended to accommodate.

The head curtain 31 preferably has two substantially vertically disposed rows of protective pleats 56 so disposed on the front face thereof that, when the loading dock shelter 1 is disposed in assembled position, the rows of pleats 56 are disposed vertically above respective ones of the stripes 55. Each of the pleats 56 are made of suitable material, such as, for example, the aforementioned fabric from which the curtains 31–33 are made, and each is secured along its upper edge portion to the head curtain 31, by a suitable means such as sewing, not shown. The lower edges of the pleats 56 are preferably left loose, and the pleats disposed above the lowermost pleat in each of the rows of pleats 56 preferably overlap the pleats disposed immediately therebelow. Such construction affords a particularly effective, wear-resistant protective covering for the front face of the head curtain 31 at the points which it has been found are subject to the most wear, namely, the areas at which the head curtain 31 are normally engaged by the rear corners of the top of a truck disposed in operative position relative to the loading dock shelter 1.

The guide stripes 55 afford an effective target for the driver of a truck backing into operative position relative to the loading dock shelter 1. A truck which engages the loading dock shelter 1 in such a position that neither side of the truck projects outwardly of the guide stripes 55, will effectively engage the curtains 31–33, only, of the loading dock shelter 1, without danger of engaging the supporting frame 7. However, to protect the loading dock shelter 1, and, particularly, the side walls 18 and 19 of the supporting frame 7, from possible damage by an over-size truck or a truck of normal size, which might be backed into improper position relative to the doorway 4, we prefer to afford bumpers 57 and 58 mounted on the wall 2 of the warehouse 3 in position to project forwardly of the side walls 18 and 19, respectively, of the supporting frame 7 in protective relation thereto, FIGS. 1–3.

The bumpers 57 and 58 may be made of any suitable material, such as, for example, iron or steel, and are preferably so constructed that they may be secured to the front walls 2 of the warehouse 3 by suitable means such as bolts 59, FIG. 2, in position to project forwardly below, and upwardly in front of the respective side walls 18 and 19 of the supporting frame 7 in such a position as to be effective to engage, and stop the bottom of the box of a truck which might be backed into such position relative to the doorway 4 that it would otherwise engage either or both of the side walls 18 and 19.

In the preferred form of the loading dock shelter shown in the drawings, the cover 6 includes two bottom wall panels 60 and 61 secured to the wall 2 of the warehouse 3 adjacent to the lower end portions 37 of the side curtains 32 and 33, respectively. The front edges of the bottom panels 60 and 61 embody upwardly projecting flanges 62, FIGS. 10 and 14, having stays 49a, similar to the stays 49, mounted therein, FIG. 14. The flanges 62 preferably curve rearwardly from the outer lateral edges thereof so as to insure that the side curtains 32 and 33 hang vertically in front thereof in the normal at-rest position of the latter. The rearward or inward spacing of flanges 62 relative to the curtains 32 and 33, such as, for example, in the nature of one inch at the inner ends thereof, so that only slight rearward movement of the curtains 32 and 33 is effective to close the gaps between the flanges 62 and the curtains 32 and 33. The outer side edges and the rear edges of the panels 60 and 61 may be secured by suitable means, such as nails or screws 63, to the lower end members 25 of the side frames 20 and to the lower sill 4a of the doorway 4, respectively, FIG. 6. The bottom panels 60 and 61 of the cover 6 are preferably made from the same flexible fabric as the curtains 31–33. With the bottom panels 60 and 61 disposed in such operative position on the loading dock shelter 1 and the warehouse 3, the lower corners of the loading dock shelter 1 are effectively closed when a truck is disposed in normal operative position thereagainst, so as to afford efficient protection against up-drafts between the side walls 18 and 19 of the supporting frame 7 and a truck disposed in the aforementioned operative engagement with the loading dock shelter 1.

With the supporting frame 7 embodying side walls which are light-permeable, outside light may filter through the top and sides of the loading dock shelter 1 to afford illumination for the interior thereof. The supporting frame 7 and the curtains 31–33 of the loading dock shelter 1 are preferably of such lateral width that, when the curtains 31–33 are disposed in the aforementioned sealing engagement with a truck, they are so disposed that such outside light can pass through the top and sides of the frame 7 in a sufficiently unobstructed manner that it affords effective illumination for the workmen passing back and forth between the warehouse and the truck.

From the foregoing it will be seen that the present invention enables a novel loading dock shelter, embodying a substantially rigid supporting frame, to be afforded.

Also, it will be seen that the present invention affords a novel loading dock shelter wherein the parts thereof are so constituted and arranged that when a truck is backed into operative engagement therewith, the loading dock shelter is automatically sealingly engaged, and held in sealing engagement, therewith in a novel and expeditious manner.

Also, it will be seen that the present invention affords a novel loading dock shelter which is so constructed that the various parts thereof may be readily manufactured, and the parts may be quickly and easily assembled into operative position on a warehouse, or the like.

Also, it will be seen that the present invention affords a novel loading dock shelter which affords an effective enclosure for a warehouse doorway and the rear end of a truck being loaded or unloaded through the doorway, while enabling outside illumination to be afforded for the interior of the loading dock shelter.

In addition, it will be seen that the present invention affords a novel loading dock shelter which is practical and efficient in operation, and which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:
1. A loading dock shelter comprising
   (a) a front cover,
   (b) means for supporting said cover in position to extend along the top and sides of a doorway in a warehouse wall in outwardly projecting relation to said wall,
   (c) said cover comprising
       (1) a flexible top panel mounted on said supporting means in position to extend along the top of said doorway and project downwardly across the upper portion of said doorway in position to sealingly engage the top of a truck backed into operative position relative to said doorway for loading or unloading thereof, and
       (2) two flexible side panels mounted on said supporting means in position to extend downwardly from said top panel along respective sides of said doorway and extend horizontally across said doorway toward the other of said side panels in position to sealingly engage the sides of said truck when the latter is disposed in said operative position, and
   (d) each of said side panels having spaced means for holding said panel in said engagement with said truck.
2. A loading dock shelter as defined in claim 1, and in which
   (a) said means for holding said panels comprise a plurality of elongated, flexible stays having one end secured to said means for supporting said cover.
3. A loading dock shelter as defined in claim 1, and in which
   (a) said top panel has spaced means for holding said top panel in said engagement with said truck.
4. A loading dock shelter as defined in claim 3, and in which
   (a) said means for holding said top and side panels comprise a plurality of elongated, flexible stays spaced from each other in each of said panels and fixedly secured at one end to said means for supporting said cover.
5. A loading dock shelter as defined in claim 1, and in which
   (a) said means for supporting said cover includes panel means which are light-permeable and disposed between said cover and said warehouse for affording outside illumination for the interior of said shelter.
6. A loading dock shelter as defined in claim 1, and in which
   (a) said means for supporting said cover comprises a supporting frame having
       (1) an elongated, substantially horizontally extending top wall and
       (2) two elongated side walls depending longitudinally from respective opposite ends of said top walls,
   (b) said top and side walls
       (1) project laterally forward from said warehouse wall and
       (2) are light-permeable,
   (c) said panels are mounted on and supported by the forward sides of respective ones of said top and side walls in such position that outside light may pass through said top and side walls into said shelter to illuminate the interior of said shelter between said truck and doorway when said truck is disposed in said operative position.
7. A loading dock shelter as defined in claim 1, and in which
   (a) said means for supporting said cover comprises a substantially rigid, elongated supporting frame
       (1) extending longitudinally along the top and sides of said doorway, and
       (2) projecting laterally forwardly of said warehouse wall,
   (b) said top panel has spaced means for holding said top panel in engagement with said truck, and
   (c) said means for holding said top and side panels comprise a plurality of flexible resilient, elongated metal stays
       (1) secured to each said panel in spaced relation to each other, and
       (2) having one end operatively attached to the forward longitudinal edge portion of said frame.
8. A loading dock shelter as defined in claim 7, and in which
   (a) said side panels have a normal, at-rest position wherein they extend toward each other across said doorway in substantially uniplanar relation to each other, and
   (b) said top panel has a normal at-rest position wherein it extends substantially vertically downwardly across the top of said doorway forwardly of said side panels.
9. A loading dock shelter as defined in claim 8, and
   (a) which includes
       (1) flexible bottom panels disposed between said warehouse wall and the bottom edge portions of respective ones of said side panels, and
   (b) in which
       (1) said bottom panels each have an edge portion disposed adjacent to a respective one of said side panels and having one of said stays mounted therein,
       (2) each of said last mentioned stays has one end operatively secured to the adjacent portion of said supporting frame, and
       (3) said bottom panels
           (a′) curve away from the respective adjacent ones of said side panels when said side panels are disposed in said normal at-rest position, and
           (b′) are engaged by said respective adjacent side panels when said truck is disposed in said operative position.
10. A loading dock shelter comprising
   (a) a front cover,
   (b) an elongated supporting frame adapted to be mounted on a wall of a warehouse in position to
       (1) extend longitudinally along the top and sides of a doorway in said wall, and
       (2) project laterally forwardly from said wall,
   (c) said cover comprising
       (1) a flexible top panel mounted on the front edge portion of said frame in position to extend along the top of said doorway and project downwardly across the upper portion of said doorway in position to engage the top of the rear of a truck backed into operative position relative to said doorway for loading and unloading said truck through said doorway, and
       (2) two flexible side panels mounted on the front edge portion of said frame in position to extend along respective sides of said doorway and project horizontally thereacross in position to engage the sides of the rear of said truck when said truck is disposed in said position,
   (d) said side panels having
       (1) a normal at-rest position, when they are not so engaged by such a truck, wherein they are disposed in substantially uniplanar relation to each other, and
       (2) an actuated position, when so engaged by said truck, wherein they project rearwardly toward said doorway,
   (e) said top panel having
       (1) a normal at-rest position, when it is not so engaged by such a truck, wherein it extends in a substantially vertical plane forwardly of said side panels, and
(2) an actuated position, when it is so engaged by said truck, wherein it projects downwardly and rearwardly toward said doorway,
(f) said frame having water-impermeable, light-permeable top and side walls for permitting outside light to pass therethrough into the interior of said shelter, and
(g) said cover panels being mounted on said frame in such position that when said panels are disposed in either of said positions said outside light passing through said frame may pass directly into the space directly between said truck and said doorway.

11. A loading dock shelter as defined in claim 10, and in which
(a) said frame comprises
(1) elongated, substantially rigid, open, top and side frame members having inner faces and outer faces, and
(2) translucent panels mounted on the outer faces of said top and side frame members.

12. A loading dock shelter comprising
(a) a front cover,
(b) means for supporting said cover in position to extend along the top and sides of a doorway in a warehouse wall,
(c) said cover comprising panels mounted on said supporting means in position to project respective adjacent upper portions of said doorway in position to sealingly engage adjacent outer surfaces of a truck backed into operative position relative to said doorway for loading or unloading of said truck,
(d) each of said panels having spaced resilient means for holding said panel in said engagement with said truck.

13. A loading dock shelter as defined in claim 12, and in which
(a) each of said panels has
(1) a normal position and
(2) an actuated position, wherein it is disposed closer to said warehouse than when it is disposed in said normal position,
(b) said resilient means comprise a plurality of spaced elongated flexible stays
(1) having one end secured to said supporting means, and
(2) secured to said panels in juxtaposition thereto, and
(c) said stays are disposed in such position that
(1) when such a truck is moved toward said warehouse into said operative position, said stays are deflected thereby toward said warehouse in a single arc, and
(2) when said truck is moved away from said warehouse out of said operative position, said stays are deflected thereby into a double-reverse bend having two substantially oppositely opening arcs.

References Cited

UNITED STATES PATENTS

| | | | |
|---|---|---|---|
| 2,272,657 | 2/1942 | Byron | 160—332 |
| 2,997,048 | 8/1961 | Gertken et al. | 134—72 |
| 3,181,205 | 5/1965 | Frommelt et al. | 52—204 |
| 3,230,675 | 1/1966 | Frommelt et al. | 52—204 |
| 3,286,417 | 11/1966 | Dazzo | 52—204 |
| 3,303,615 | 2/1967 | O'Neal | 52—204 |

REINALDO P. MACHADO, *Primary Examiner.*

Disclaimer 3,403,489.—*Cyril P. Frommelt* and *Sylvan J. Frommelt*, Dubuque, Iowa. LOADING DOCK SHELTERS. Patent dated Oct. 1, 1968. Disclaimer filed May 20, 1970, by the assignee, *Dubuque Awning & Tent Company*.

Hereby enters this disclaimer to claims 1, 2, 3, 4, 5, 6, 7, 8, 10, 11, 12 and 13 of said patent.

[*Official Gazette August 18, 1970.*]